US012644691B2

(12) United States Patent
Patti et al.

(10) Patent No.: US 12,644,691 B2
(45) Date of Patent: Jun. 2, 2026

(54) POSITION DETECTION SYSTEM USING LASER LIGHT INTERFEROMETRY

(71) Applicant: VDL ENABLING TECHNOLOGIES GROUP B.V., Eindhoven (NL)

(72) Inventors: Francesco Patti, Eindhoven (NL); Johannes Hubertus Antonius Van De Rijdt, Eindhoven (NL)

(73) Assignee: VDL ENABLING TECHNOLOGIES GROUP B.V., Eindhoven (NL)

( * ) Notice: Subject to any disclaimer, the term of this patent is extended or adjusted under 35 U.S.C. 154(b) by 137 days.

(21) Appl. No.: 18/730,281

(22) PCT Filed: Feb. 1, 2023

(86) PCT No.: PCT/NL2023/050044

§ 371 (c)(1),
(2) Date: Jul. 19, 2024

(87) PCT Pub. No.: WO2023/149798

PCT Pub. Date: Aug. 10, 2023

(65) Prior Publication Data

US 2025/0116499 A1 Apr. 10, 2025

(30) Foreign Application Priority Data

Feb. 4, 2022 (NL) ...................................... 2030825

(51) Int. Cl.
G01B 9/02017 (2022.01)
G01B 9/02015 (2022.01)
G01B 11/00 (2006.01)

(52) U.S. Cl.
CPC ..... *G01B 9/02021* (2013.01); *G01B 9/02027* (2013.01); *G01B 11/002* (2013.01)

(58) Field of Classification Search
CPC ............ G01B 9/02021; G01B 9/02027; G01B 11/002
See application file for complete search history.

(56) References Cited

U.S. PATENT DOCUMENTS

| | | | |
|---|---|---|---|
| 6,486,955 B1 | 11/2002 | Nishi | |
| 7,280,225 B2 | 10/2007 | Akimoto | |
| 2005/0190375 A1* | 9/2005 | Akimoto | ............. G03F 7/70775 356/500 |
| 2009/0310105 A1 | 12/2009 | Kuriyama | |

OTHER PUBLICATIONS

International Search Report received in PCT/NL2023/050044, dated Apr. 12, 2023, in 2 pages.

* cited by examiner

*Primary Examiner* — Jamil Ahmed

(74) *Attorney, Agent, or Firm* — Procopio, Cory, Hargreaves & Savitch LLP

(57) ABSTRACT

According to the disclosure, a position detection system using laser light interferometry is proposed, capable of measuring the positions and displacements of an object relative to and within an XYZ system of coordinates.
By directing the Y laser light beam parallel to the XY plane to and from a Y measuring mirror positioned perpendicular to the XY plane and directing the Z laser light beam under an angle α relative to the XY plane to and from a Z measuring mirror, the optics of the position detection system can be simplified as any additional Z measuring mirror can be obviated. Particularly, this results in less occupied work volume in the direct vicinity where semiconductor and integrated circuit manufacturing processes.

11 Claims, 4 Drawing Sheets

POSITION DETECTION SYSTEM USING LASER LIGHT INTERFEROMETRY

CROSS-REFERENCE TO RELATED APPLICATIONS

This application is US National Stage of International Patent Application PCT/NL2023/050044, filed Feb. 1, 2023, which claims benefit of NL2030825, filed Feb. 4, 2022, the contents of both of which are incorporated herein by reference.

TECHNICAL FIELD

The invention relates to a position detection system using laser light interferometry for measuring the positions and displacements of an object relative to and within an XYZ system of coordinates, the system using a holder comprising a mounting surface for the object, the mounting surface being oriented in the XY plane of the XYZ system of coordinates. Such laser light interferometry detection systems can be implemented, for example, in semiconductor and integrated circuit manufacturing processes.

BACKGROUND OF THE INVENTION

Applications requiring high precision positioning and displacements, for example wafer substrates undergoing semiconductor and integrated circuit manufacturing processes, implement laser light interferometry detection systems. Multiple measuring mirrors and laser light beams directed to and from those mirrors are used for determining the positions and the displacements of an object within an XYZ system of coordinates based on laser light interferometry.

Present day laser light interferometry detection systems allow for multiple degrees of freedom (DOF) measurements within such XYZ system of coordinates, however the accuracy of these measurements are limited and adversely affect the efficiency of the overall process in which laser light interferometry detection system is implemented.

For example, for displacement distances or strokes, which are longer than the dimensions of the holder multiple DOF measurements might be lost. Furthermore, presently known applications implement additional measuring mirrors positioned within the working space, thus occupying work volume in the direct vicinity where semiconductor and integrated circuit manufacturing processes are performed.

Moreover, the use of extra measuring mirrors within the working space requires, next to occupying work volume, additional optical reflections per measurement, demanding higher requirements on the surface quality per measuring mirror, more complex adjustments of the measuring mirrors and a smaller angular range of the moving holder. Accordingly, the dynamics of the Z measuring mirrors may limit the overall performance of the laser light interferometry detection system.

The present disclosure aims to provide a solution for the above identified problems and to present a position detection system using laser light interferometry with a reduced and simplified optics, hence having reduced constructional dimensions and improved accuracy as to the measurement of a position and/or displacement of a holder within an XYZ system of coordinates.

SUMMARY OF THE INVENTION

According to a first aspect of the disclosure, a position detection system using laser light interferometry is proposed, capable of measuring the positions and displacements of an object relative to and within an XYZ system of coordinates, the system using a holder comprising a mounting surface for the object, the mounting surface being oriented in the XY plane of the XYZ system of coordinates, several X, Y and Z measuring mirrors as well as a plurality of X, Y, and Z optical devices, each optical device structured to emit and direct an X, Y or Z laser light beam to and from a respective X, Y or Z measuring mirror and structured to detect and convert at least part of the X, Y or Z laser light beams reflected by the respective X, Y or Z measuring mirrors into electric measuring signals, the electric measuring signals comprising at least information as to the X, Y and Z position of the object, wherein, for measuring the Z position of the object, the at least one Y laser light beam is directed parallel to the XY plane to and from a Y measuring mirror positioned perpendicular to the XY plane and the at least one Z laser light beam is directed under an angle α relative to the XY plane to and from a Z measuring mirror.

By directing the Y laser light beam parallel to the XY plane to and from a Y measuring mirror positioned perpendicular to the XY plane and directing the Z laser light beam under an angle α relative to the XY plane to and from a Z measuring mirror, the optics of the position detection system can be simplified as any additional Z measuring mirror can be obviated. Particularly, this results in less occupied work volume in the direct vicinity where semiconductor and integrated circuit manufacturing processes.

In a particular example of the position detection system according to the disclosure, the at least one angled Z laser light beam is directed perpendicular to and from the Z measuring mirror. Accordingly, this further reduces the constructional dimensions of the detection system, in particular its Z-dimension.

As in a preferred example according to the disclosure, the X, Y and Z measuring mirrors are solely mounted on the holder for the object, the overall construction is simplified whilst its measuring accuracy is improved. There is no additional optics mounted in the working space, and all degree of freedom measurements can be performed by a single mirror reflection surface mounted to the holder, which results in less strict surface finish requirements of the mirror surfaces, hence a cost reduction. Also less complex adjustments to the system are necessary as only the orientations of several the X, Y, and Z optical devices need adjustment. Additionally, this construction allows for a larger angular range of the holder.

As the laser interferometry optics in the example according to the disclosure exhibits only one reflection for the Z laser light beam (in fact for all X, Y, Z laser light beams), the reflected laser light beam will return to the respective optical device sensor much more closer to the ideal direction (which is parallel to the emitted laser light beam). Due to this minimal beam distortion, more or larger angular displacement of the holder is allowed without losing the measuring signal. In the prior art application, a second mirror is implemented, requiring two additional beam reflections before the laser light beam is detected again by the optical device. Thus, the initial positioning error of both mirrors would add up and therefore reduce the (angular) margin for rotating the holder without losing the signal. Note that although the holder displacements are mainly translations, small rotations are always present. When multiple mirrors are used, thus resulting in a limited angular displacement margin for the holder, the signal might be lost.

Depending on the constructional dimension of the holder being used and the desired accuracy of the measurements, the angle $\alpha$ of the at least one angled Z laser light beam relative to the XY plane is in the range between 5°-45°, in particular in the range of 5°-25°, more in particular in the range of 5°-15°, and more in particular the angle $\alpha$=7°.

In a particular example of the position detection system according to the disclosure, the Y measuring mirror and the Z measuring mirror form a composite YZ measuring mirror being composed of a first mirror face positioned perpendicular to the XY plane and a second mirror face orientated at the angle $\alpha$ relative to the first mirror face. This allows for a further reduction of the constructional dimensions of particularly the holder, in particular its thickness or Z-dimension.

In a further detail, the composite YZ measuring mirror comprises a third mirror face positioned perpendicular to the XY plane and adjoining the second mirror face opposite the first mirror face. The third mirror face may serve as an additional Y measuring mirror for an additional Y laser light beam and can accordingly be used for measuring a further degree of freedom of the holder, in particular a rotation or tilting thereof.

Optionally, the holder may comprise two composite YZ measuring mirrors, each composite YZ measuring mirror being mounted at opposite sides of the holder. With this feature it is also possible to measure any changes in the longitudinal dimension of the holder due to thermal expansion. By continuously directing an Y laser light beam by means of the two Y optical devices towards both opposite sides of the holder, two opposite Y dimension measurements are obtained. Based on these two Y measurements, the width of the holder can be measured constantly, allowing to monitor any thermal expansion. Accordingly, by compensating for such thermal expansion additional accuracy as to the actual X, Y, Z measurements can be obtained.

In an advantageous example according to the disclosure, allowing the measurement of the X degree of freedom, for measuring the X position of the holder, at least one X laser light beam is directed parallel to the XY plane to and from an X measuring mirror positioned perpendicular to the XY plane.

Additional degrees of freedom can be measured, such as rotation or tilting movements around the X, Y or Z axes. For example, for measuring a rotational position of the holder around the Z axis, the position detection system comprises at least two Y optical devices positioned at some distance from each other in the XY plane. For measuring a rotational position of the holder around the X axis, the position detection system comprises at least two Y optical devices positioned at some distance from each other in the YZ plane, and, for measuring a rotational position of the holder around the Y axis, the position detection system comprises at least two Z optical devices positioned at some distance from each other.

BRIEF DESCRIPTION OF THE DRAWINGS

The invention will now be discussed with reference to the drawings, which show in.

DETAILED DESCRIPTION OF THE INVENTION

Figure 1A:
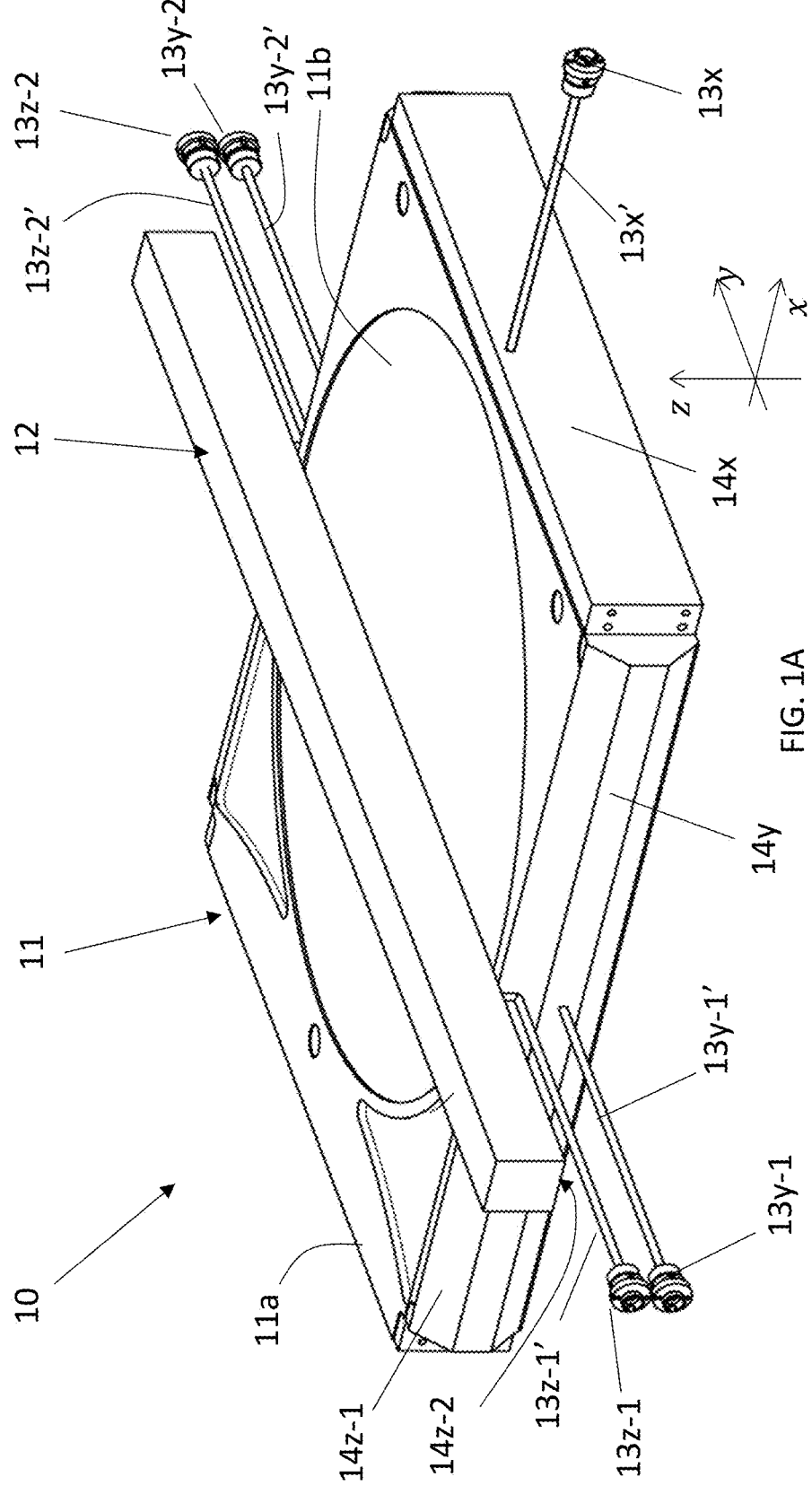
FIGS. 1A-1B an example of a position detection system using laser light interferometry according to the prior art.

For a proper understanding of the invention, in the detailed description below corresponding elements or parts of the invention will be denoted with identical reference numerals in the drawings.

It is known in the prior art, that applications requiring high precision positioning and displacements, for example wafer substrates undergoing semiconductor and integrated circuit manufacturing processes, may implement laser light interferometry detection systems. Multiple measuring mirrors and laser light beams directed to and from those mirrors are used for determining the positions and the displacements of an object within an XYZ system of coordinates based on laser light interferometry.

Figure 1B:
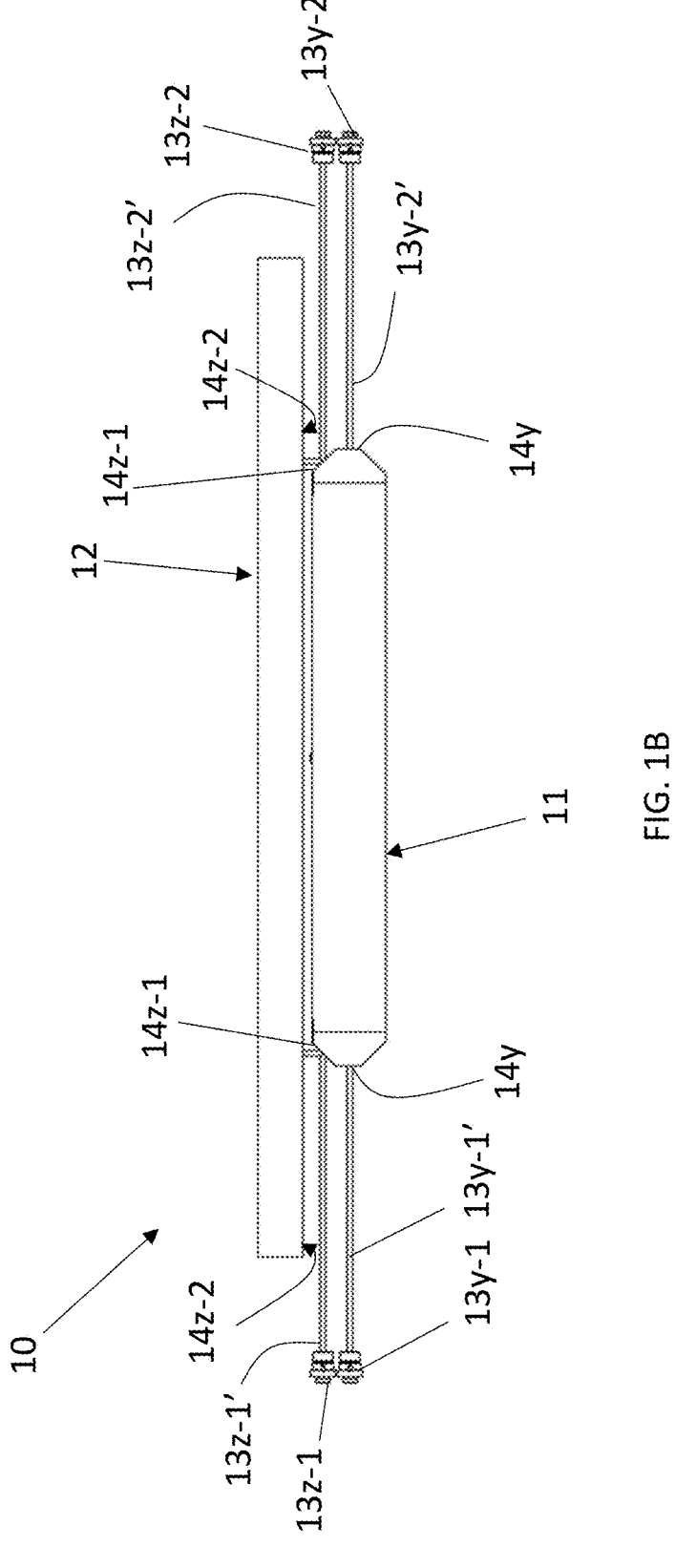

An example of such laser light interferometry detection system according to the state of the art is depicted in FIGS. 1A and 1B and is denoted with reference numeral 10. Such position detection system 10 using laser light interferometry is capable of measuring the positions and displacements of an object relative to and within an XYZ system of coordinates. In an example, the object (not shown in FIGS. 1A-1B) may be a wafer substrate undergoing semiconductor and integrated circuit manufacturing processes for the manufacturing of semiconductor components.

Usually, the system 10 implements a holder 11 for holding the object (wafer substrate). As shown in FIGS. 1A-1B, holder 11 encompasses a mounting surface 11a for the object, and preferably such object is accommodated within a mounting space 11b machined or provided in the mounting surface 11a. The mounting surface 11a of the holder 11 is oriented, preferably parallel, in the XY plane of a XYZ system of coordinates, its orientation being depicted in a corner of FIG. 1A.

The system 10 according to the state of the art furthermore implements several X, Y and Z measuring mirrors, which are denoted with reference numerals 14x, 14y and 14z. Optical devices 13x, 13y (13y-1), and 13z (13z-1) are each structured to emit and direct an laser light beam 13x', 13y-1', and 13z-1' to and from one of the respective X, Y or Z measuring mirrors 14x, 14y and 14z (14z-1/14z-2) for measuring the respective X, Y, Z position/displacement (degree of freedom, DOF) of the holder 11 (including an object mounted in the mounting space 11b on the mounting surface 11a) relative to and within the XYZ system of coordinates.

In particular, the respective laser light beam is being reflected by the respective X, Y or Z measuring mirrors 14x, 14y and 14z (14z-1/14z-2), and at least part of the reflected laser light beams is detected by the optical devices 13x, 13y (13y-1), and 13z (13z-1). The reflected and detected laser light beams are converted into electric measuring signals comprising at least information as to the X, Y and Z position of the holder 11 (and object) within the XYZ system of coordinates. Using a suitable signal processing unit (not shown) the emitted and reflected laser light beams are used to calculate the X, Y and Z position using laser interferometry.

Present day laser light interferometry detection systems allow for multiple degrees of freedom (DOF) measurements within such XYZ system of coordinates, however the accuracy of these measurements are limited and adversely affect the efficiency of the overall process in which laser light interferometry detection system is implemented.

For example, for displacement distances or strokes, which are longer than the dimensions of the holder multiple DOF measurements will be lost. Furthermore, presently known applications implement additional optics positioned within the working space, thus occupying work volume in the direct vicinity where semiconductor and integrated circuit manufacturing processes are performed.

In the example of FIGS. 1A and 1B, such additional optics is denoted with reference numeral 12, and is positioned directly above the holder 11 (seen in the Z direction). The additional optics 12 serves as a measuring mirror support and obstructs the work volume in the direct vicinity of the holder 11, where e.g. semiconductor and integrated circuit manufacturing processes are to be performed.

In combination with FIG. 1B, the Z position of the holder 11 relative to and within the XYZ system of coordinates is measured with a first Z measuring mirror 14$z$-1 mounted to the holder 11 and a second Z measuring mirror 14$z$-2 mounted to the additional optics (measuring mirror support) 12. The first Z measuring mirror 14$z$-1 is oriented at a 45° angle to the holder 11 relative to the XY plane/mounting surface 11$a$, whereas the second Z measuring mirror 14$z$-2 is oriented parallel to the XY plane/mounting surface 11$a$ and is facing the mounting surface 11$a$ of the holder 11.

Optical device 13$z$-1 is mounted in a fixed manner within the frame (not shown) of the laser light interferometry detection system 10 and is structured as e.g. a laser light emitting device and generates and emits a laser light beam 13$z$-1'. The laser light beam 13$z$-1' is directed towards the 45° angled first Z measuring mirror 14$z$-1 and reflected towards the second Z measuring mirror 14$z$-2 on the optics 12. The laser light beam 13$z$-1' is subsequently reflected back via the second Z measuring mirror 14$z$-2 and the first Z measuring mirror 14$z$-1 towards the optical device 13$z$-1. Using laser interferometry, the Z position of the holder 11 relative to the XYZ system of coordinates is determined using the emitted laser light beam and (the part of) the reflected laser light beam 13$z$-1'.

The use of the extra measuring mirror 14$z$-2 mounted to the additional optics 12 within the working space requires, next to occupying work volume, additional optical reflections per measurement, demanding higher requirements on the surface quality per measuring mirror 14$z$-1 and 14$z$-2, as well as more complex adjustments of the measuring mirrors and a smaller angular range of the movements of the holder 11. Accordingly, the dynamics of the Z measuring mirrors may limit the overall performance of the laser light interferometry detection system 10 according to the state of the art.

Figure 2A:
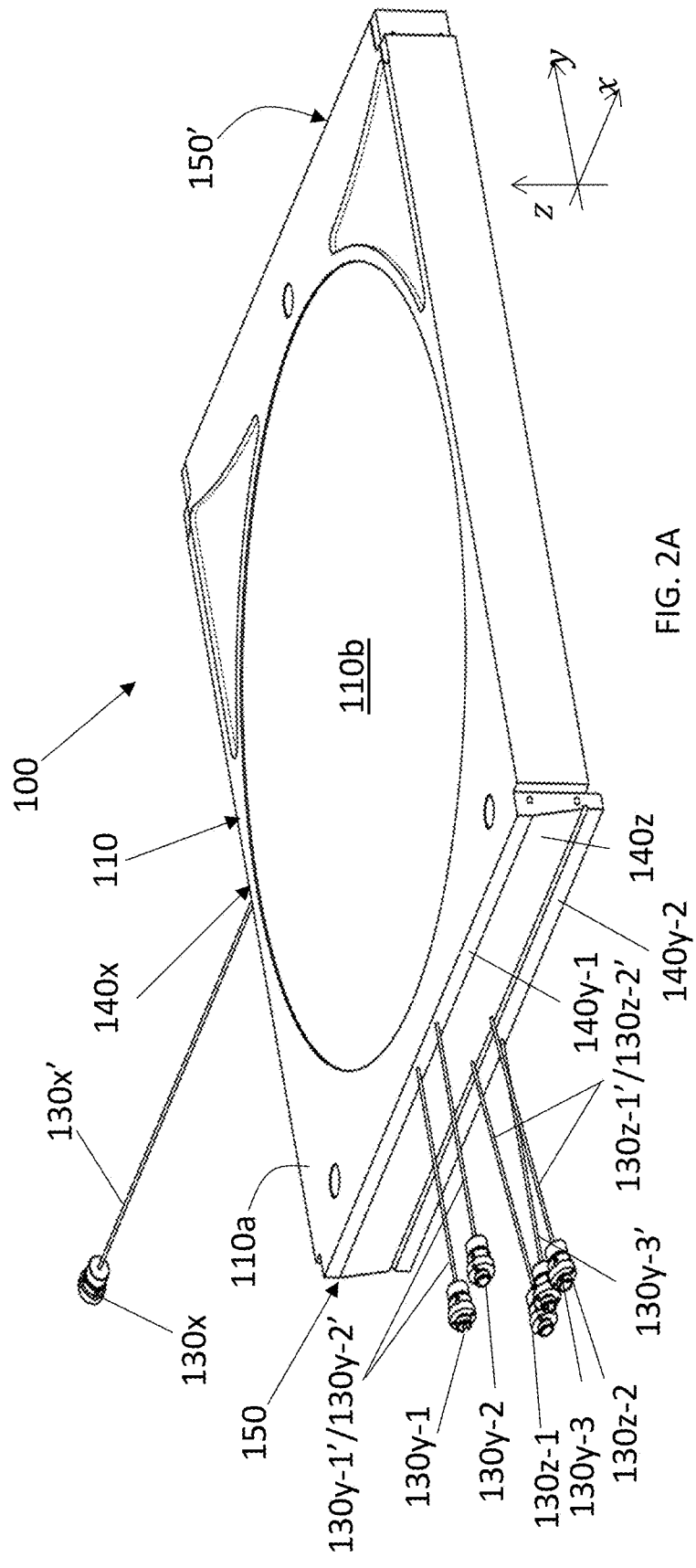
FIGS. 2A-2B an example of a position detection system using laser light interferometry according to the disclosure.
Figure 2B:
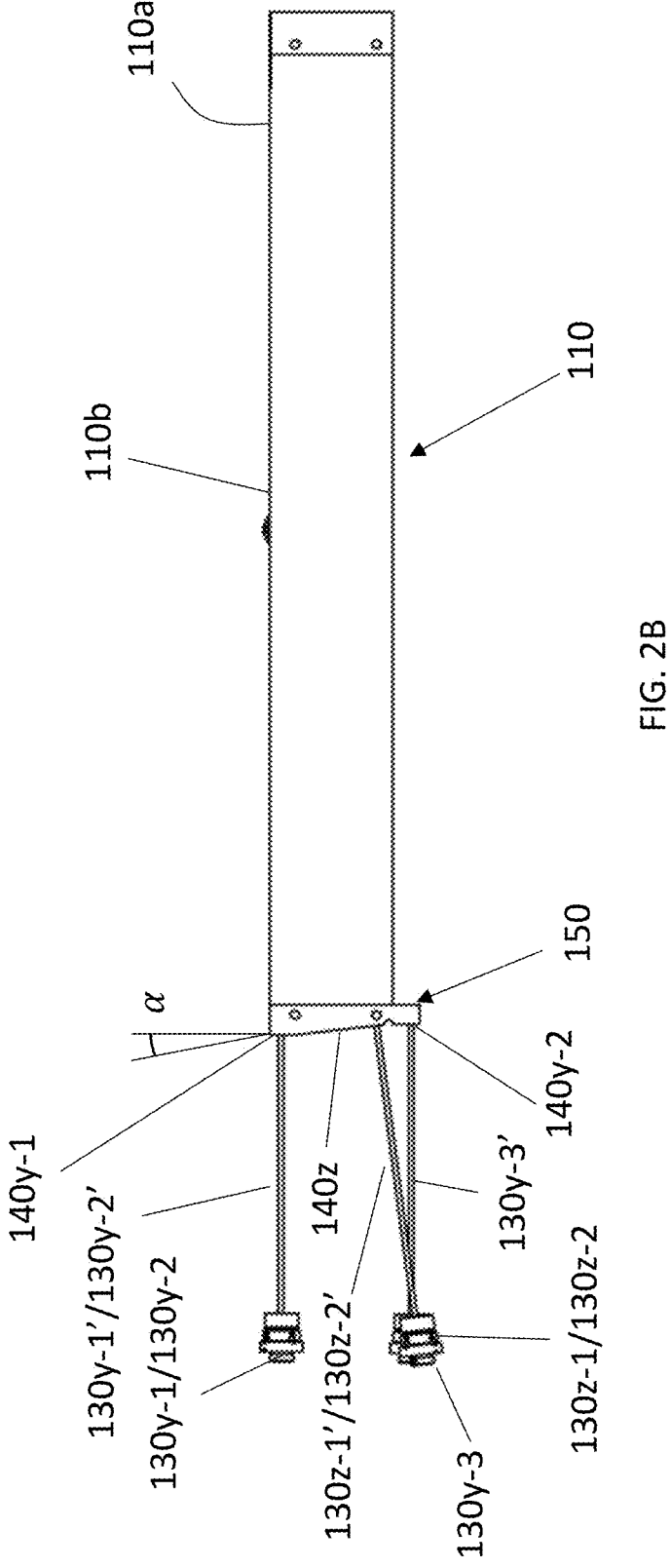

The present disclosure aims to provide a solution for the above identified problems and presents in FIGS. 2A-2B an example of a position detection system 100 using laser light interferometry with a reduced and simplified optics, hence having reduced constructional dimensions and improved accuracy as to the measurement of a position and/or displacement of a holder within an XYZ system of coordinates.

As depicted in FIGS. 2A-2B, the position detection system 100 using laser light interferometry is likewise capable of measuring the positions and displacements of an object relative to and within an XYZ system of coordinates. Similarly as in the state of the art system 10, a holder 110 is implemented also comprising a mounting surface 110$a$ oriented in the XY plane of the XYZ system of coordinates. The mounting surface 110$a$ of the holder 110 is provided with a mounting space 110$b$ for an object (not depicted), e.g. a wafer substrate.

In the example of the position detection system 100 according to the disclosure, the optics comprise several X, Y and Z measuring mirrors denoted with 140$x$, 140$y$-1 and 140$z$. Likewise, a plurality of X, Y, and Z optical devices 130$x$, 130$y$-1, 130$y$-2, 130$z$-1 and 130$z$-2 are mounted in a fixed manner next and near the holder 110. Each optical device 130$x$, 130$y$-1, 130$y$-2, 130$z$-1 and 130$z$-2 is e.g. structured as a laser light beam emitting source and emits and directs a respective X, Y or Z laser light beam 130$x$',

130$y$-1', 130$y$-2', 130$z$-1' and 130$z$-2' to and from a respective X, Y or Z measuring mirror 140$x$, 140$y$-1, 140$y$-2, and 140$z$.

Any reflected part of the X, Y or Z laser light beams 130$x$', 130$y$-1', 130$y$-2', 130$z$-1' and 130$z$-2' is detected by the respective optical device 130$x$, 130$y$-1, 130$y$-2, 130$z$-1 and 130$z$-2 and converted into electric measuring signals. As in the prior art laser interferometry techniques, the electric measuring signals contains at least information as to the X, Y and Z position of the holder 110 relative to the XYZ system of coordinates.

For example, for the measurement of the X degree of freedom or X position (e.g. in mm) of the holder 110 within the XYZ system of coordinates, at least one X optical device 130$x$ is implemented, which generates, emits and directs an X laser light beam 130$x$' in a parallel orientation to the XY plane towards the X measuring mirror 140$x$. The X measuring mirror 140$x$ is mounted to the holder 110 and is positioned perpendicular to the XY plane, which plane is formed by the mounting surface 110$a$. Accordingly, the X laser light beam 130$x$' impinges perpendicular on the X measuring mirror 140$x$ and is reflected in an opposite direction back to the at least one X optical device 130$x$.

The advantageous example according to the disclosure is capable of measuring the Z position (e.g. in mm) of the holder 110 with a reduced and simplified optics, which is less complex as the optics of the state of the art, as depicted in FIGS. 1A and 1B. For measuring the Z position of the holder 110 and the object mounted thereon, at least one Y optical device 130$y$-1 is used, which emits and directs at least one Y laser light beam 130$y$-1' parallel to the XY plane towards a Y measuring mirror 140$y$-1 mounted to the holder 110 and positioned perpendicular to the XY plane formed by the mounting surface 110$a$. Additionally, at least one Z optical device 130$z$-1 generates and emits a corresponding Z laser light beam 130$z$-1', which is directed under an angle $\alpha$ relative to the XY plane to and from a Z measuring mirror 140$z$.

Accordingly, the angled Z laser light beam 130$z$-1' is not directed parallel to the Y laser light beam 130$y$-1', but is inclined under the same angle $\alpha$ relative to the Y laser light beam 130$y$-1'. See FIG. 2B for more detail.

Both Y laser light beam 130$y$-1' and angled Z laser light beam 130$z$-1' are reflected back to the respective Y and Z optical devices 130$y$-1; 130$z$-1 and the Z measurement (z position, e.g. in mm) of the holder 110 relative to the XYZ system of coordinates is determined by a differential measurement of the laser interferometry signals generated by both Y and Z optical devices 130$y$-1 and 130$z$-1:

$$Z = Y_1/(\sin(\alpha)\cos(\alpha) - Z_1/\sin(\alpha) + Z_0$$

Or $$\Delta Z = Z - Z_0 = Y_1/(\sin(\alpha)\cos(\alpha)) - Z_1/\sin(\alpha),$$

with $Z_0$ the initial Z-position (e.g. in mm) of the holder 110 in the XYZ system of coordinates.

By directing the Y laser light beam 130$y$-1 parallel to the XY plane (mounting surface 110$a$ of the holder) to and from a Y measuring mirror 140$y$-1 which positioned perpendicular to the XY plane/mounting surface 110$a$ and directing the Z laser light beam 130$z$-1' under an angle $\alpha$ relative to the XY plane/mounting surface 110$a$ to and from the Z measuring mirror 140$z$, the optics of the position detection system 100 can be simplified as any additional Z measuring mirror as in FIGS. 1A and 1B can be obviated. Particularly, this results in less occupied work volume in the direct vicinity where semiconductor and integrated circuit manufacturing processes.

As shown in FIG. 2B, the at least one angled Z laser light beam 130z-1' is directed perpendicular to and from the Z measuring mirror 140z. The constructional dimensions of the detection system 100, in particular its Z-dimension, are herewith further reduced.

It should be noted, that as an advantage of the system 100 according to the disclosure, all X, Y and Z measuring mirrors are solely mounted on the holder 110. This simplifies the overall construction and improves the measuring accuracy. For example, no additional optics mounted in the working space is necessary as in the prior art depicted in FIGS. 1A and 1B. Also all degree of freedom measurements can be performed by a single mirror reflection surface (denoted with reference numeral 150) mounted to the holder 110, which results in less strict surface finish requirements of the mirror surfaces 140y-1 and 140z, which is a significant cost reduction. Also less complex adjustments to the system 100 are necessary as only the orientations of several the X, Y, and Z optical devices need adjustment. Additionally, this construction allows for a larger angular range of the holder 110.

Depending on the constructional dimension of the holder being used and the desired accuracy of the measurements, the angle α of the at least one angled Z laser light beam 130z-1' relative to the XY plane/mounting surface 110a is in the range between 5°-45°, in particular in the range of 5°-25°, more in particular in the range of 5°-15°, and more in particular the angle α=7°.

As stipulated above, the advantage of the system 100 according to the disclosure is the use of a single mirror reflection surface mounted to the holder 110 for measuring all degree of freedom measurements, in particular the Y and Z degrees of freedom (both e.g. in mm). As shown in the example of FIGS. 2A and 2B, reference numeral 150 denotes a single, composite YZ measuring mirror being formed of both the first Y measuring mirror 140y-1 and the Z measuring mirror 140z. The first Y measuring mirror 140y-1 forms a first mirror face of the composite YZ measuring mirror 150, which first mirror face 140y-1 is positioned perpendicular to the XY plane/mounting surface 110a of the holder 110. A second mirror face forms the Z measuring mirror 140z and is orientated at the angle α relative to the first mirror face 140y-1. This allows for a further reduction of the constructional dimensions of particularly the holder 110, in particular its thickness or Z-dimension.

In the example shown, the first Y measuring mirror/first mirror face 140y-1 is positioned closest/closer to the mounting surface 110a than the adjoining angled Z measuring mirror/second mirror face 140z.

The Z position or direction of the holder 110 relative to the XYZ system of coordinates is determined or measured by a differential measurement of the laser interferometry measurement on the angled mirror surface 140z combined with the laser interferometry measurement on the straight mirror surface 140y-1.

Whereas the X degree of freedom (e.g. in mm) is measured using the optical device 130x and the X measuring mirror 140x, see FIG. 2A, the Y and Z degrees of freedom are measured using a single optical device 130y-1 and 130z-1 and the single, composite YZ measuring mirror 150 consisting of the straight mirror surface 140y-1 and the angled mirror surface 140z with both the Y laser light beam

130y-1' and the angled Z laser light beam 130z-1' impinging perpendicular on their respective mirror surfaces 140y-1 and 140z.

Additional three degrees of freedom can be measured with the single, composite YZ measuring mirror 150, such as rotation or tilting movements around the X, Y or Z axes (e.g. indicated with w, θ, and φ). For example, for measuring a rotational position of the holder 110 around the Z axis, the position detection system 100 comprises at least two Y optical devices 130y-1 and 130y-2, hence an additional Y optical device 130y-2 next to the already implemented Y optical device 130y-1. Both Y optical devices 130y-1 and 130y-2 are positioned at some distance from each other in the same XY plane parallel to the mounting surface 110a. Both Y optical devices 130y-1 and 130y-2 direct respective Y laser light beams 130y-1' and 130y-2' towards the first, straight measuring mirror 140y-1. Any rotation around the Z-axis can be determined or measured by a differential measurement of the laser interferometry measurement on the reflected Y laser light beams 130y-1' and the laser interferometry measurement on the other reflected Y laser light beams 130y-2'.

For measuring a rotational position of the holder 110 around the X axis, the position detection system 100 comprises at least two Y optical devices denoted with 130y-1 (or 130y-2) and 130y-3, hence an additional, third Y optical device 130y-3 next to the already implemented Y optical device 130y-1 (130y-2). Both Y optical devices 130y-1 and 130y-3 are positioned at some distance from each other in the YZ plane perpendicular to the mounting surface 110a. Both Y optical devices 130y-1 and 130y-3 direct respective Y laser light beams 130y-1' and 130y-3' towards the respective first, straight measuring mirror 140y-1 and a third, also straight measuring mirror 140y-2.

For this advantageous example according to the disclosure, the composite YZ measuring mirror 150 comprises a third mirror face denoted with reference numeral 140y-2. This third mirror face 140y-2 is positioned in a perpendicular orientation to the XY plane/mounting surface 110a and parallel to the first Y measuring mirror/first mirror face 140y-1. In this example of the disclosure, the third mirror face 140y-2 adjoins the second mirror face 140z opposite the first mirror face 140y-1. The third mirror face 140y-2 is positioned furthest away from the mounting surface 110a and serves as an additional Y measuring mirror 140y-2.

Any rotation around the X-axis can be determined or measured by a differential measurement of the laser interferometry measurement on the reflected Y laser light beam 130y-1' via the first Y measuring mirror 140y-1 and the laser interferometry measurement on the reflected Y laser light beams 130y-3' via the additional, further Y measuring mirror 140y-2. Note, both the first Y measuring mirror 140y-1 and the further Y measuring mirror 140y-2 have a perpendicular orientation to the XY plane/mounting surface 110a and are parallel to each other, with the angled mirror surface 140z positioned between the two Y measuring mirrors 140y-1 and 140y-2.

In alternative examples of the YZ measuring mirror 150, the functionality of the Y measuring mirror 140y-1 (first mirror face) and the Y measuring mirror 140y-2 (third mirror face) can be reversed, with the third mirror face 140y-2 (for measuring the rotation around the X axis) being positioned closest to the mounting surface 110a and the first mirror face 140y-1 (for measuring the rotation around the X axis together with the third mirror face and for measuring the Y position/displacement and for measuring the Z position/ displacement together with the second mirror face 140*z*) being positioned furthest away from the mounting surface 110*a*.

For an accurate measurement of the rotation around the X axis it is desirable to have the first Y optical device 130*y*-1 and the third Y optical device 130*y*-3 to be positioned at some distance from each other, and the same applies to the distance between both first mirror face 140*y*-1 and third mirror face 140*y*-2 with preferably the second mirror face 140*z* being positioned between both mirror faces 140*y*-1 and 140*y*-2.

Additionally, in FIG. 2B, the thickness of the second mirror face 140*z* (e.g. the angled Z measuring mirror 140*z*) decreases (becomes smaller or thinner) in a direction away from the mounting surface 110*a* or the thickness progresses towards the mounting surface 110*a*. However, in another example of the YZ measuring mirror 150, the angled second mirror face 140*z* can be reversed, such that the thickness thereof decreases (becomes smaller or thinner) in a direction towards the mounting surface 110*a*.

Finally, for measuring a rotational position of the holder 110 around the Y axis, the position detection system 100 comprises at least two Z optical devices 130*z*-1 and 130*z*-2 positioned at some distance from each other yet at the same angled orientation relative to the XY plane/mounting surface 110*a*. The two Z optical devices 130*z*-1 and 130*z*-2 direct respective Z laser light beams 130*z*-1' and 130*z*-2' towards the angled measuring mirror 140*z*. Any rotation around the Y-axis is measured by the differential measurement of the laser interferometry measurement on the reflected Z laser light beams 130*z*-1' and the laser interferometry measurement on the other reflected Z laser light beams 130*z*-2'.

Although one single, composite YZ measuring mirror 150 suffices to measure five degrees of freedom (Y, Z, and three axis rotations ψ, θ, and φ), with the X measuring mirror 140*x* measuring the remaining sixth degree of freedom (X), the holder 110 may comprise two composite YZ measuring mirrors 150-150', each composite YZ measuring mirror 150-150' being mounted at opposite sides of the holder 110. With this feature it is also possible to measure any changes in the longitudinal dimension of the holder 110 due to thermal expansion. By continuously directing an Y laser light beam 130*y*-1' (or 130*y*-2' or 130*y*-3') by means of two corresponding, yet opposite Y optical devices 130*y*-1 (or 130*y*-2 or 130*y*-3) towards two composite YZ measuring mirrors 150-150' on opposite sides of the holder 110, two opposite Y dimension measurements are obtained. Based on these two Y measurements, the width of the holder 110 can be measured constantly, allowing to monitor any thermal expansion. Accordingly, by compensating for such thermal expansion additional accuracy as to the actual X, Y, Z measurements can be obtained.

LIST OF REFERENCE NUMERALS

10 position detection system according to the prior art
11 holder
11*a* XY mounting surface of holder 11
11*b* mounting space of holder 11
12 additional optics (mirror support) with second Z measuring mirror 14*z*-2 (state of the art)
13*x* X optical device
13*y*-1/2 first/second Y optical device (state of the art)
13*z*-1/2 first/second Z optical device (state of the art)
13*x*' X laser light beam (state of the art)
13*y*-1'/2' first/second Y laser light beam (state of the art)
13*z*-1'/2' first/second Z laser light beam (state of the art)

14*x* X measuring mirror (state of the art)
14*y* Y measuring mirror (state of the art)
14*z*-1/2 first/second Z measuring mirror (state of the art)
100 position detection system according to the disclosure
110 holder
110*a* XY mounting surface of holder 110
110*b* mounting space of holder 110
130*x* X optical device
130*y*-1/2/3 first/second/third Y optical device (according to the disclosure)
130*z*-1/2 first/second Z optical device (according to the disclosure)
130*x*' X laser light beam (according to the disclosure)
130*y*-1'/2'/3' first/second/third Y laser light beam (according to the disclosure)
130*z*-1'/2' first/second Z laser light beam (according to the disclosure)
140*x* X measuring mirror (according to the disclosure)
140*y*-1/2 first/second Y measuring mirror face (according to the disclosure)
140*z* Z measuring mirror face (according to the disclosure)
150/150' first/further composite YZ measuring mirror

The invention claimed is:

1. A position detection system using laser light interferometry for measuring the positions and displacements of an object relative to and within an XYZ system of coordinates, the system using a holder comprising a mounting surface for the object, the mounting surface being oriented in the XY plane of the XYZ system of coordinates, several X, Y and Z measuring mirrors as well as a plurality of X, Y, and Z optical devices, each optical device structured to emit and direct an X, Y or Z laser light beam to and from a respective X, Y or Z measuring mirror and structured to detect and convert at least part of the X, Y or Z laser light beams reflected by the respective X, Y or Z measuring mirrors into electric measuring signals, the electric measuring signals comprising at least information as to the X, Y and Z position of the object, wherein, for measuring the Z position of the object, the at least one Y laser light beam is directed parallel to the XY plane to and from a Y measuring mirror positioned perpendicular to the XY plane and the at least one Z laser light beam is directed under an angle α relative to the XY plane to and from a Z measuring mirror.

2. The position detection system according to claim 1, wherein the at least one angled Z laser light beam is directed perpendicular to and from the Z measuring mirror.

3. The position detection system according to claim 1, wherein the X, Y and Z measuring mirrors are solely mounted on the holder for the object.

4. The position detection system according to claim 1, wherein the angle α of the at least one angled Z laser light beam relative to the XY plane is in the range between 5°-45°, in particular in the range of 5°-25°, more in particular in the range of 5°-15°, and more in particular the angle α=7°.

5. The position detection system according to claim 1, wherein the Y measuring mirror and the Z measuring mirror form a composite YZ measuring mirror being composed of a first mirror face positioned perpendicular to the XY plane and a second mirror face orientated at the angle α relative to the first mirror face.

6. The position detection system according to claim 5, wherein the composite YZ measuring mirror comprises a third mirror face positioned perpendicular to the XY plane and adjoining the second mirror face opposite the first mirror face.

7. The position detection system according to claim 5, wherein the holder comprises two composite YZ measuring mirrors, mounted at opposite sides of the holder.

8. The position detection system according to claim 1, wherein, for measuring an X position of the holder, at least one X laser light beam is directed parallel to the XY plane to and from an X measuring mirror positioned perpendicular to the XY plane.

9. The position detection system according to claim 1, wherein, for measuring a rotational position of the holder around the Z axis, the position detection system comprises at least two Y optical devices positioned at some distance from each other in the XY plane.

10. The position detection system according to claim 1, wherein, for measuring a rotational position of the holder around the X axis, the position detection system comprises at least two Y optical devices positioned at some distance from each other in the YZ plane.

11. The position detection system according to claim 1, wherein, for measuring a rotational position of the holder around the Y axis, the position detection system comprises at least two Z optical devices positioned at some distance from each other.

* * * * *